Oct. 12, 1971  J. KASPERCZYK ET AL  3,611,749
COUPLING

Filed Sept. 4, 1969  3 Sheets-Sheet 3

JÓZEF KASPERCZYK
HENRYK SIDLO
INVENTOR

BY *Karl F. Ross*
ATTORNEY

3,611,749
COUPLING

Józef Kasperczyk and Henryk Sidlo, Chorzow, Poland, assignors to Huta Zygmunt Przedsiebiorstwo Panstwowe, Lagiewniki, Poland
Filed Sept. 4, 1969, Ser. No. 855,313
Claims priority, application Poland, Sept. 14, 1968, P 129,056
Int. Cl. F16d 3/16
U.S. Cl. 64—8                                                   2 Claims

ABSTRACT OF THE DISCLOSURE

The disclosure relates to a coupling device for transmitting torque of very great magnitude such as is required for driving rolls in heavy rolling mills. The coupling belongs to the type having an inner member (plug), formed by the end of one shaft and an outer member (socket), formed by the end of the second shaft. At the longitudinal edges of the inner member are placed inserts, made by cutting out a part of a sphere along two planes intersecting each other inside the sphere at an angle equal to the angle formed by the lateral faces of the inner member. The inserts with their spherical surfaces are located in concave internal recesses made in the outer member. The geometrical centers of the spherical surfaces lie on the bisectors of the angles. The coupling enables some longitudinal movement as well as some rocking movement of the shafts.

SPECIFICATION

(1) Field of the invention

Figure 1:
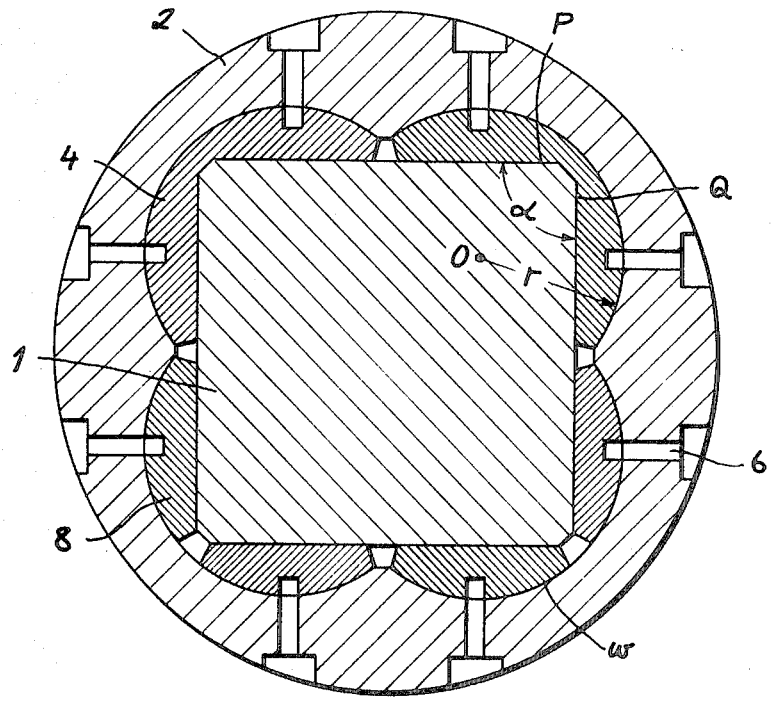

The present invention relates to a coupling device for connecting two shafts not aligned strictly co-axially which allows, while in motion, a slidable connection of the two shafts and the angle between the shafts to be varied within certain limits.

(2) Background of the invention

The coupling of our invention is intended for transmitting torque of the greatest magnitude and is particularly applicable for driving rolls of heavy rolling mills; however, it is to be appreciated that the invention has broader applications and may be used in any other installation in which two rotating elements have to be joined by a coupling for transmitting torque of great magnitude.

Specifically, the present invention relates to a coupling device in which a hollow end part of one shaft constitutes the outer member of the coupling into which is introduced the end part of another shaft constituting the inner member of the coupling, the cavity in the outer member and the inner member having a similar cross-section, e.g. a square one.

In the prior art this kind of coupling has been known. The main disadvantage of this type of coupling consists in a non-uniform distribution of pressures over the contact areas of elements co-operating in the transmission of the torque. When used for transmitting torques of a very great magnitude, such for example as in heavy rolling mill drives, the concentration of pressure in some areas of the bearing surface brings about a rapid wear of elements and shortens the service life of the coupling, although the elements are made of best-grade steel.

In the prior art various means have been employed to reduce the ill effects of pressure concentration on the coupling. Thus, there are known propositions of extending the contact area between the co-operating members of the coupling by making the cross-section of the said members in the form of a cross or a cloverleaf. But, notwithstanding the enlarged area of contact between the said members the strength of the coupling is not substantially improved as, due to a non-uniform distribution of pressures still only a part of surfaces is engaged in transmitting the torque.

Another way of reducing the ill effects of concentration of pressures consists in interposing inserts (pads) between the inner and the outer members of the coupling. For example, there are previously known couplings in which inserts having the form of segments of a sphere are used. The flat bases of said inserts bear against the flat faces of the inner member and the curved peripheries are bedded in round concave recesses which are provided in the inner portion of the outer member. If the inner member has a square cross-section, the bisector of its spherical surface is perpendicular to the lateral face of the inner member and passes through, or very close to, the axis of the inner member. Thus, while in operation, the inserts are subjected to a couple of forces which tend to separate one side of the insert from its bed and exerts at the same time a very high pressure against the face of the other side. Therefore, the proposed positioning of inserts is not advantageous, and while transmitting high torque, deleterious to the elements of the coupling.

In the case of the inner member having a cross-shaped cross-section, it has been proposed to dispose the spheric segmental inserts at the flat faces of the cross directed to the rotation. With such arrangement the bisectors of the angles of spherical segments are tangent to the described circle. The said arrangement of inserts is not so deleterious as the prior described one, but if used in transmitting torque of great magnitude, it serves no useful purpose. The couplings of that design show no longer service life than couplings having no inserts and the manufacturing costs are much higher.

(3) Objects of the invention

It is the object of this invention to provide a coupling free from disadvantages described before, in which the end part of one shaft constitutes the outer member of the coupling and the end part of another shaft constitutes the inner member of the said coupling.

A further object of the present invention is to provide a coupling in which the inserts, i.e. the parts interposed between the outer member and the inner member of the coupling, are formed of segments of spheres.

(4) Summary of the invention

In accordance with our invention the said segments are spheres from which a major part is cut out along two planes which intersect each other at an angle identical to that at which the flat faces of the inner member intersect each other. So that, if e.g. the cross-section of the inner member is square, the said angle is equal to 90°. The so shaped inserts, i.e. the spherical elements, are according to the invention positioned along the longitudinal edges of the inner member. The inner portion of the outer member surrounding the cavity is provided with curved recesses shaped to closely fit the curved peripheries of the inserts and to rotatably key the outer member and the inserts and the inner member together. Due to the said inserts, the forces transmitting the torque which, in conventional couplings not having the inserts, are concentrated at the edges of the elements, are uniformly distributed over large surfaces.

In another embodiment of the present invention, instead of a single-piece insert, divided inserts are used without any harm to the operational utility of the said inserts. By dividing the insert along a plane bisecting the angle formed by two sides of the inner member, two identical half inserts will be obtained which, if positioned symmetrically on two adjoining faces of the inner member would perform the same duty as a single-piece insert.

The choice, whether to employ a single-piece insert or two divided inserts is arbitrary.

(5) Description of the drawing

Figure 2:
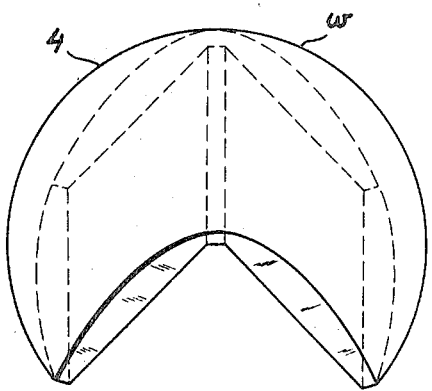
Figure 4:
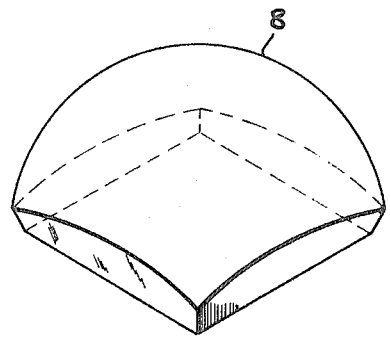
Figure 3:
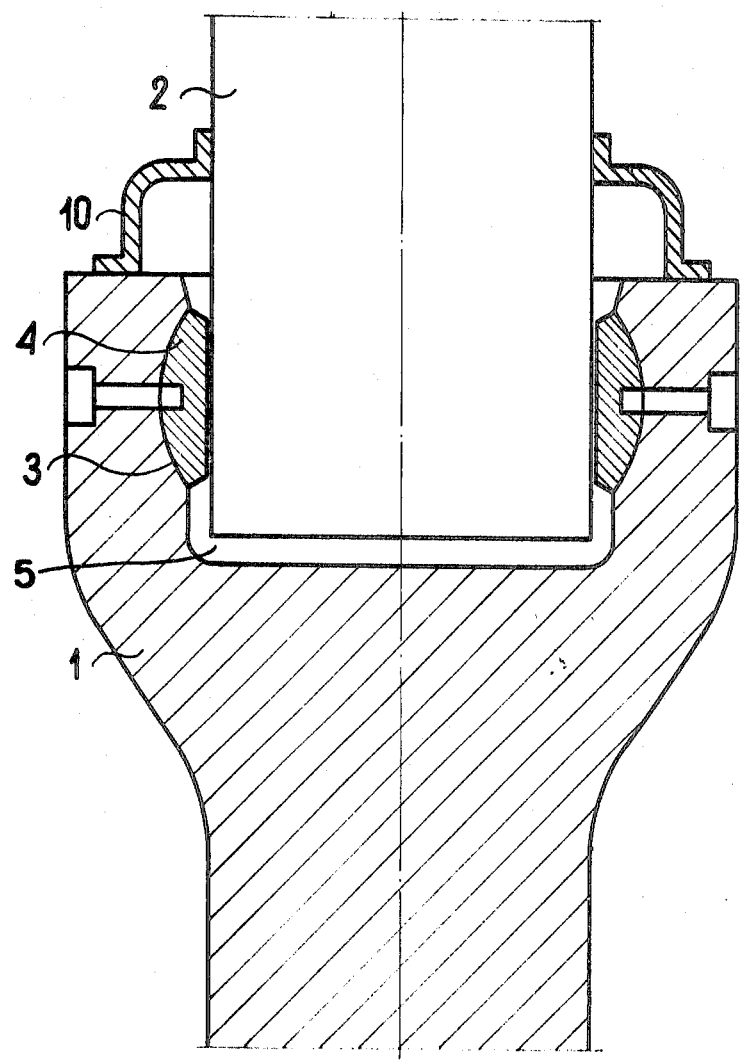
Figure 8:
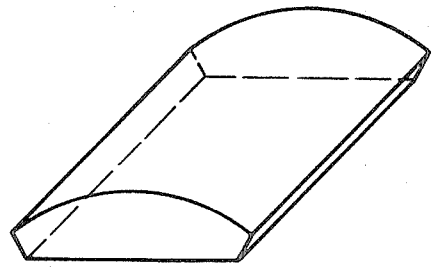
Figure 6:
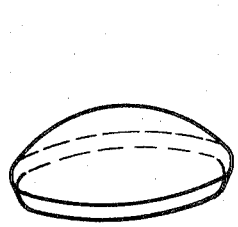
Figure 5:
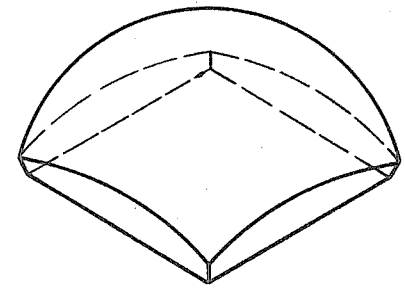
Figure 7:
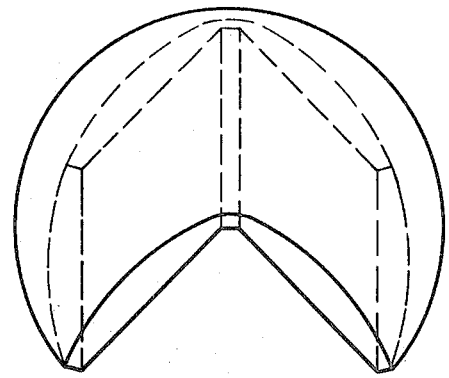

The present invention will now be further described with reference to the diagrammatic drawing in which:

FIG. 1 is a cross-sectional view of the coupling;
FIG. 2 is an axonometric view of the insert;
FIG. 3 is an axial sectional view of the coupling;
FIG. 4 is an axonometric view of the half-insert.

(6) Specific description

The main idea of the invention is shown in FIG. 1. The edge of the inner member 1 is formed by the lateral surfaces P and Q which intersect each other at an angle $\alpha$. The aperture of the angle $\alpha$ as well as the number of longitudinal edges of the inner member depend on the cross-section of the inner member, e.g. it may be triangular, square, etc. In the example shown, the inner member has a square cross-section and an angle $\alpha$ is equal to 90°. To obtain a uniform distribution of pressures, which during the operation of the coupling bear either on the surface P or Q, according to the direction of rotation, and to prevent the concentration of pressures which leads to a premature wear of the conventional couplings, the edges of the inner member 1 are slidably held by inserts 4 which have curved outer peripheries $w$. The insert 4 is a segment of a sphere of the radius $r$ with the geometrical center situated on the bisector of the angle $\alpha$. To make an insert, a piece of appropriate material, e.g. of steel, is machined to form a sphere of radius $r$, by cutting deeply along the planes P and Q, the major part of the sphere is cut out and rejected, while the remaining part having the form of a spherical segment constitutes the insert 4. The number of inserts in the coupling is the same as the number of longitudinal edges of the inner member 1. The inserts are lodged in respective round and concave recesses having the same radius $r$, the recesses are provided in the inner hollow portion of the outer member 2 and are shaped to closely fit the curved convex peripheries of inserts. The outer member 2 is the end part of the shaft 3.

The contact of curved peripheries $w$, convex and concave, permits a rocking movement of the shaft and ensures the flexibility of the coupling. The slidable connection along the planes P and Q makes possible a longitudinal movement of the shafts. To permit the longitudinal movement in both directions, a free space in the form of a chamber 5 is provided in the bottom of the cavity.

To facilitate the assembling operations of the coupling, the inserts 4, which are placed in the recesses in the outer member 2 before the introduction of the inner member 1, are secured by means of screws for the time of assembling operations. The said screws are screwed into the inserts 4 through holes 6 in the wall of the outer member 2.

To permit the coupling to be properly filled with lubricant, the internal space is closed with a seal 7 of resilient and oil resisting material.

In FIG. 1, in the upper part of the drawing, inserts 4 are shown which bear against the faces on both sides of the edge of the inner member 1, and in the lower part of the drawing the divided inserts are represented. The divided inserts 8, which have the form of segments of a sphere with flat bases, cannot be employed singly but only in pairs, so that a pair of divided inserts 8 (FIG. 4) is used instead of the insert 4 (FIG. 2) and occupies the same position as the insert 4, i.e. on both sides of the edge of the inner member 1 symmetrically in relation to the edge. The geometrical centers of the divided inserts are coincident with each other.

The coupling of our invention, which is flexible and permits a longitudinal displacement of shaft in relation to each other has sustained a long operation without failure in heavy-duty conditions due to an advantageous distribution of pressures over a large area of bearing surfaces, and to a satisfactory lubrication of all co-operating elements. Due to these advantages, the said coupling is better suited for heavy-duty operation in rolling mills than any previously known, or proposed couplings.

What we claim is:

1. A torque-transmitting coupling, especially for driving a roll of a rolling mill, comprising a first shaft having an end of regular polygonal cross-section forming a plug; a second shaft forming a socket receiving said plug; and a respective spherical-segment insert mounted on each longitudinal edge of said plug and straddling a pair of lateral sides of the regular polygon, each of said segments being constituted as a solid segment of a sphere internally cut out along a pair of planes intersecting at an angle corresponding to the angle between adjoining sides of the polygon to provide flat flanks in the respective segment lying along corresponding faces of the plug, said segments each having a geometrical center lying along the bisector of the respective angle and a radius as measured from the respective center in excess of the distance between the center and the longitudinal edge straddled by the segment, said socket being formed internally with concave recesses adapted to receive the respective inserts and of a radius and center of curvature corresponding to the radius and center of the respective segment.

2. The coupling defined in claim 1 wherein said plug has a square cross-section and four such inserts are provided, said inserts substantially completely surrounding said plug, said segments being symmetrical with respect to diagonal planes through said plug.

References Cited

UNITED STATES PATENTS

| | | | |
|---|---|---|---|
| 1,169,901 | 2/1916 | Wittemann | 64—8 |
| 2,697,335 | 12/1954 | Peterson | 64—8 |

MARK M. NEWMAN, Primary Examiner

R. HEALD, Assistant Examiner